US007979615B1

(12) United States Patent
Spitzer

(10) Patent No.: US 7,979,615 B1
(45) Date of Patent: Jul. 12, 2011

(54) APPARATUS FOR MASKED ARBITRATION BETWEEN MASTERS AND REQUESTORS AND METHOD FOR OPERATING THE SAME

(75) Inventor: Marc Spitzer, San Jose, CA (US)

(73) Assignee: PMC-Sierra US, Inc., Santa Clara, CA (US)

( * ) Notice: Subject to any disclaimer, the term of this patent is extended or adjusted under 35 U.S.C. 154(b) by 1387 days.

(21) Appl. No.: 11/152,993

(22) Filed: Jun. 14, 2005

Related U.S. Application Data

(63) Continuation-in-part of application No. 11/075,543, filed on Mar. 8, 2005, now abandoned.

(60) Provisional application No. 60/551,643, filed on Mar. 8, 2004.

(51) Int. Cl.
*G06F 13/00* (2006.01)
*G06F 13/14* (2006.01)

(52) U.S. Cl. ............ 710/107; 710/28; 710/36; 710/240; 710/243

(58) Field of Classification Search ........... 710/240–244
See application file for complete search history.

(56) References Cited

U.S. PATENT DOCUMENTS

| 6,859,852 | B2 * | 2/2005 | Jahnke et al. ................. 710/243 |
| 6,976,109 | B2 * | 12/2005 | Shenderovich ............... 710/243 |
| 7,051,133 | B2 * | 5/2006 | Takata .......................... 710/111 |
| 7,051,135 | B2 * | 5/2006 | Zhu ............................... 710/116 |
| 7,120,714 | B2 * | 10/2006 | O'Connor et al. ............ 710/243 |

OTHER PUBLICATIONS

Computers Without Clocks—taken from Scientific American—Aug. 2002—11 pages.*
Clockless Chips—taken from Technology Review—Oct. 2001—7 pages.*

* cited by examiner

*Primary Examiner* — Brian T Misiura
(74) *Attorney, Agent, or Firm* — Martine Penilla & Gencarella, LLP

(57) ABSTRACT

An apparatus is disclosed for handling multiple requestors desiring access to a resource. The apparatus includes a plurality of masters and a plurality of arbitrators. Each arbitrator is assigned to a different one of the plurality of masters. Also, each arbitrator is defined to consider a different portion of the multiple requestors when selecting a requestor to be serviced by the master to which the arbitrator is assigned. Each arbitrator is further defined to select a requestor from the different portion of the multiple requestors, such that selection of a particular requestor is not duplicated among the plurality of arbitrators. Additionally, requestor selection by each of the plurality of arbitrators is performed in a same clock cycle.

20 Claims, 9 Drawing Sheets

APPARATUS FOR MASKED ARBITRATION BETWEEN MASTERS AND REQUESTORS AND METHOD FOR OPERATING THE SAME

CROSS-REFERENCE TO RELATED APPLICATIONS

This application is a continuation-in-part of prior U.S. application Ser. No. 11/075,543, filed Mar. 8, 2005 now abandoned, which claims the benefit of U.S. Provisional Application No. 60/551,643, filed on Mar. 8, 2004. The disclosures of U.S. application Ser. No. 11/075,543 and U.S. Provisional Application No. 60/551,643 are incorporated herein by reference. This application is also related to U.S. patent application Ser. No. 11/152,965, filed on even date herewith, and entitled "Apparatus for Real-Time Arbitration Between Masters and Requestors and Method for Operating the Same," the disclosure of which is incorporated herein by reference.

BACKGROUND

In communication systems, resources are made available to other systems. Such resources can vary, but typically include access to processing power, execution of code, access of data, or exchange of data. Given that a resource may be requested by one or more requesting entities (e.g., requestors) at any given time or time period, bottlenecks can occur. To handle such bottlenecks, arbitration schemes have been used.

Normal arbitration schemes use a state machine which is designed to only look at one master at a time, per clock cycle. Then, during a given cycle, the state machine will assign one of many requestors to one master. This means that multiple requestors may have to wait for later cycles, despite the fact that there are enough masters available to provide the requested service.

In view of the foregoing, there is a need for a system, circuitry, and method for enabling more efficient access to resources when multiple requestors need such resource access.

SUMMARY

In one embodiment, a circuit is disclosed for handling multiple requestors desiring access to a resource. The circuit includes a plurality of masters and a plurality of arbitrators. Each arbitrator is assigned to a different one of the plurality of masters. Also, each arbitrator is defined to consider a different portion of the multiple requestors when selecting a requestor to be serviced by the master to which the arbitrator is assigned. Each arbitrator is further defined to select a requestor from the different portion of the multiple requestors, such that selection of a particular requestor is not duplicated among the plurality of arbitrators. Additionally, requestor selection by each of the plurality of arbitrators is performed in a same clock cycle.

In another embodiment, an interface circuit is disclosed. The interface circuit is defined to connect a plurality of requestors to a plurality of masters. The interface circuit includes a plurality of arbitrators respectively assigned to the plurality of masters. Each of the plurality of arbitrators is defined to select in a same clock cycle a different one of the plurality of requestors to be serviced by the master to which the arbitrator is assigned. Each of the plurality of arbitrators includes mask generation logic, input processing logic, remaining requestors determination logic, and requestor selection logic.

In another embodiment, a method is disclosed for operating each arbitrator in a hierarchy of arbitrators to uniquely connect multiple requestors to multiple masters in a common clock cycle. Each arbitrator in the hierarchy of arbitrators is configured to support a different one of the multiple masters. The method includes operating the arbitrator to identify a subset of the multiple requestors from which a requestor can be selected for servicing. The subset of the multiple requestors includes requestors that are currently transmitting a request. Each requestor in the subset of the multiple requestors is also required to be visible to the arbitrator and not visible to a higher level arbitrator in the arbitrator hierarchy. Each requestor in the subset of the multiple requestors is also required to not be currently receiving service from either of the multiple masters. The method also includes operating the arbitrator to select a requestor to be serviced by its master from the identified subset of the multiple requestors. In the method, each arbitrator is defined to perform in a same clock cycle the operations of identifying the subset of the multiple requestors and selecting a requestor from the subset of the multiple requestors for servicing.

Other aspects of the invention will become more apparent from the following detailed description, taken in conjunction with the accompanying drawings, illustrating by way of example the present invention.

DETAILED DESCRIPTION

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
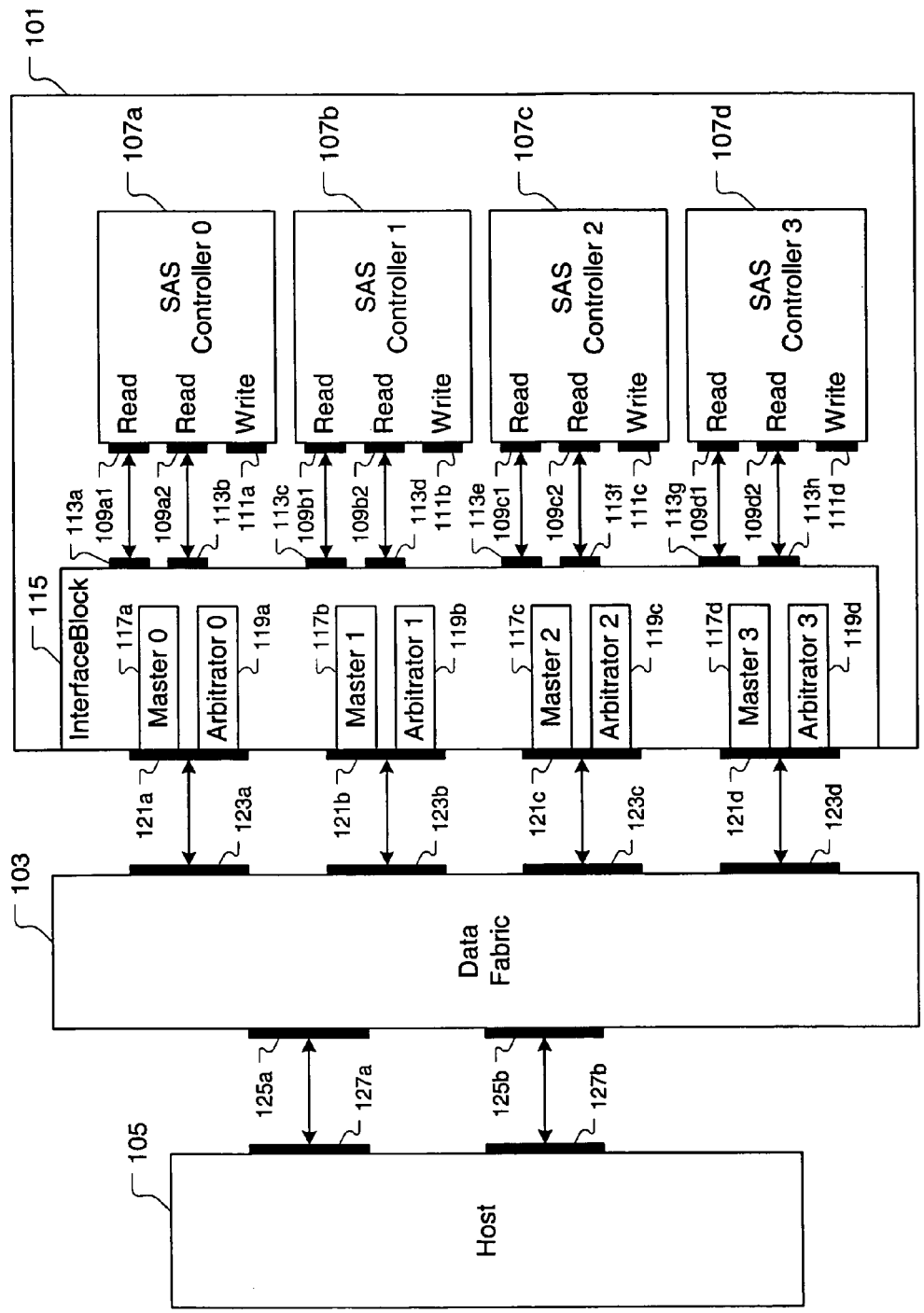
FIG. 1 is an illustration showing an exemplary portion of a Serial Attached SCSI (SAS) communication architecture.

FIG. 1 is an illustration showing an exemplary portion of a Serial Attached SCSI (SAS) communication architecture. The architecture includes a SAS interface engine 101, a data fabric 103, and a host block 105. The SAS interface engine 101 includes a number of SAS controllers 107a-107d. In one embodiment, each of the SAS controllers 107a-107d is connected to control a peripheral device, e.g., disk drive. In the embodiment of FIG. 1, four SAS controllers 107a-107d are shown. However, it should be appreciated that in other embodiments the SAS interface engine 101 can include any number of SAS controllers. In the embodiment of FIG. 1, each SAS controller 107a-107d includes two read DMA (direct memory access) engines and one write DMA engine. However, it should be appreciated that in other embodiments the SAS controllers 107a-107d can be configured to have a different number of read and write DMA engines.

For SAS controller 0 (107a), the read DMA engines are respectively connected to read ports 109a1 and 109a2, and the write DMA engine is connected to a write port 111a. For SAS controller 1 (107b), the read DMA engines are respectively connected to read ports 109b1 and 109b2, and the write DMA engine is connected to a write port 111b. For SAS controller 2 (107c), the read DMA engines are respectively connected to read ports 109c1 and 109c2, and the write DMA engine is connected to a write port 111c. For SAS controller 3 (107d), the read DMA engines are respectively connected to read ports 109d1 and 109d2, and the write DMA engine is connected to a write port 111d.

Each read port 109a1-109d2 of the SAS controllers 107a-107d is connected to a respective port 113a-113h of an interface block 115 within the SAS interface engine 101. The interface block 115 presents a generic DMA interface to the SAS controllers 107a-107d. In the embodiment of FIG. 1, the generic DMA interface presented by the interface block 115 includes four master ports 121a-121d. However, it should be appreciated that in other embodiments the interface block 115 can be configured to have a different number of master ports. Each master port 121a-121d is serviced by a respective master read engine 117a-117d and a respective master support engine 119a-119d. For ease of discussion, each master read engine 117a-117d is referred to as a "master" and each master support engine 119a-119d is referred to as an "arbitrator." Each master port 121a-121d is connected to a respective port 123a-123d of the data fabric 103. Thus, the masters 117a-117d effectively define the interface from the data fabric 103 to the read DMA engines of the SAS controllers 107a-107d.

The data fabric 103 operates as a routing engine to route communications from targets 127a-127b on the host block 105 to the SAS interface engine 101. In one embodiment, the data fabric is defined as a state machine that operates to connect the master ports 121a-121d to targets 127a-127b, appropriately. In the embodiment of FIG. 1, the host block 105 is depicted as having two targets 127a-127b, i.e., dataport interfaces 127a-127b, that connect with a respective port 125a-125b of the data fabric 103. It should be appreciated, however, that in other embodiments the host block 105 can include a different number of targets.

During operation of the SAS communication architecture, each read DMA engine of the SAS controllers 107a-107d can act as a read requestor. When a read DMA engine issues a read request from its respective read port 109a1-109d2, the read request is transmitted to the interface block 115, and to an available master 121a-121d. From the master 121a-121d, the read request is transmitted through the data fabric 103 to the appropriate target 127a-127b at the host block 105. The read request is then processed at the host block 105. In one embodiment, the host block 105 is defined to communicate with an operating system of a computing platform.

With the SAS interface engine 101 including fewer masters 117a-117d than read DMA engines, it should be appreciated that a system is needed to efficiently arbitrate between the multiple read DMA engines and the multiple masters 117a-117d. For discussion purposes, each read DMA engine and its associated read port 109a1-109d2 within the multiple SAS controllers 107a-107d will be referred to hereafter as a "requestor."

In one embodiment of the present invention, the requests transmitted from each requestor are simultaneously transmitted to each arbitrator 119a-119d associated with a respective master 117a-117d. Each arbitrator 119a-119d processes each transmission from the various requestors to determine which requestor is to be serviced by the master corresponding to the arbitrator. To avoid conflicts, a particular transmission from a given requestor should not be simultaneously serviced by multiple masters. With the present invention, each arbitrator simultaneously processes the incoming requestor transmissions. Thus, the number of requestors that can be serviced in a given clock cycle is equal to the number of available masters. Once the arbitrator has selected a requestor for its master to service, the master is notified of the selection and proceeds with processing the transmission from the selected requestor. The master is not involved in the requestor selection process. Thus, the master is simply made aware of the particular requestor that it needs to service.

Figure 2:
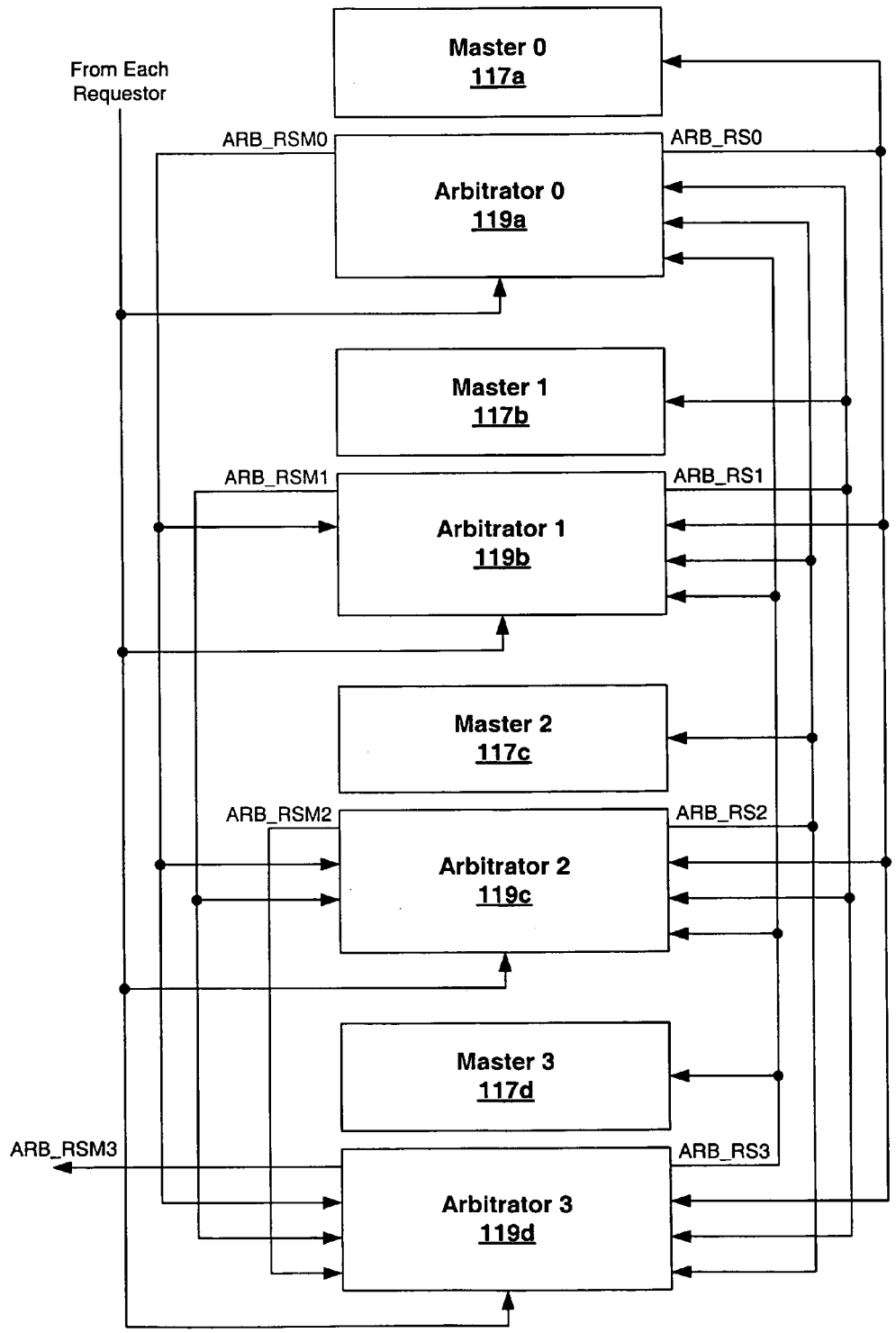
FIG. 2 is an illustration showing interconnections between the arbitrators and the masters within the interface block of FIG. 1, in accordance with one embodiment of the present invention.

FIG. 2 is an illustration showing interconnections between the arbitrators 119a-119d and the masters 117a-117d within the interface block 115 of FIG. 1, in accordance with one embodiment of the present invention. As previously mentioned, the SAS interface engine 101 of FIG. 1 represents one exemplary implementation having eight read DMA engines and four masters 117a-117d. It should be appreciated that the present invention can be implemented with any number of read DMA engines and any number of masters. However, for discussion purposes, the present invention is described in the context of eight read DMA engines and four masters, as depicted in FIG. 1. Given the description of the present invention herein, adjustment of the present invention to accommodate a different number of read DMA engines and/or masters will be readily apparent to those skilled in the art.

Using masked arbitration, the arbitrators 119a-119d are defined to select a requestor to be serviced by their respective master 117a-117d, such that a requestor can be selected for each master 117a-117d in each clock cycle, as appropriate. The masked arbitration provided by the arbitrators 119a-119d allows as many requestors to be serviced at one time as there are available masters 117a-117d. With respect to FIG. 2, each arbitrator 119a-119d is connected to receive a transmission "from each requestor", i.e., from each read DMA engine of the SAS controllers 107a-107d, in accordance with each clock cycle. The transmission received from each requestor signifies whether or not a request is being made by the requestor. If a particular arbitrator's master is not busy servicing a requestor, the incoming transmissions from the requestors are processed by the particular arbitrator to select one of the requestors to be serviced by the particular arbitrator's master.

The set of requestors from which a particular arbitrator is allowed to make a selection is identified by a bit-mask denoted as ARB_RSMn, where n represents the number of the particular arbitrator within an arbitrator hierarchy. Within the bit-mask ARB_RSMn, each requestor corresponds to a particular bit position. A high state of a given bit in the bit-mask ARB_RSMn indicates that the requestor corresponding to the given bit is included within the set of requestors from which the arbitrator n is allowed to make a selection. Correspondingly, a low state of a given bit in the bit-mask ARB_RSMn indicates that the requestor corresponding to the given bit is not included within the set of requestors from which the arbitrator n is allowed to make a selection. For ease of discussion, the bit-mask ARB_RSMn will be referred to as the requestor selection mask for arbitrator n.

The requestor selection mask for each arbitrator (ARB_RSM0, ARB_RSM1, ARB_RSM2, ARB_RSM3) is communicated to each lower arbitrator as defined by the arbitrator hierarchy. In the arbitrator hierarchy, arbitrator 0 (119*a*) is the highest level arbitrator and arbitrator 3 (119*d*) is the lowest level arbitrator. Thus, the requestor selection mask ARB_RSM0 is communicated to arbitrator 1 (119*b*), arbitrator 2 (119*c*), and arbitrator 3 (119*d*). The requestor selection mask ARB_RSM1 is communicated to arbitrator 2 (119*c*) and arbitrator 3 (119*d*). The requestor selection mask ARB_RSM2 is communicated to arbitrator 3 (119*d*). Because arbitrator 3 (119*d*) is the lowest level arbitrator, the requestor selection mask ARB_RSM3 is not communicated to any other arbitrator.

The requestor selection masks communicated from a particular arbitrator to each lower arbitrator will prevent each lower arbitrator from being able to select a requestor that is currently available for selection by a higher level arbitrator. Thus, there is no overlap in the set of requestors that is available for selection by a given arbitrator with respect to the other arbitrators.

Once each arbitrator 119*a*-119*d* has selected a requestor to be serviced by their respective master 117*a*-117*d*, the identities of the selected requestors are registered and communicated to both the arbitrator's master and to each other arbitrator. Communication of the selected requestor to the appropriate master enables the master to begin servicing the requestor. Communication of the selected requestor to each other arbitrator continues for the duration of the selected requestor's servicing to ensure that each other arbitrator does not select a requestor that is currently being serviced.

The requestor selection made by each arbitrator is identified by a bit-mask denoted as ARB_RSn, where n represents the number of the particular arbitrator within the arbitrator hierarchy. Thus, the requestor selected by arbitrator 0 (119*a*) is communicated as the bit-mask ARB_RS0 to master 0 (117*a*) and to each of arbitrator 1 (119*b*), arbitrator 2 (119*c*), and arbitrator 3 (119*d*). The requestor selected by arbitrator 1 (119*b*) is communicated as the bit-mask ARB_RS1 to master 1 (117*b*) and to each of arbitrator 0 (119*a*), arbitrator 2 (119*c*), and arbitrator 3 (119*d*). The requestor selected by arbitrator 2 (119*c*) is communicated as the bit-mask ARB_RS2 to master 2 (117*c*) and to each of arbitrator 0 (119*a*), arbitrator 1 (119*b*), and arbitrator 3 (119*d*). The requestor selected by arbitrator 3 (119*d*) is communicated as the bit-mask ARB_RS3 to master 3 (117*d*) and to each of arbitrator 0 (119*a*), arbitrator 1 (119*b*), and arbitrator 2 (119*c*).

It should be appreciated that each arbitrator 119*a*-119*d* is defined to select a requestor in the same clock cycle without overlap in requestor selection. The functionality of each arbitrator 119*a*-119*d* is described in more detail below to enable a greater appreciation of how the arbitrators 119*a*-119*d* of the present invention accomplish the simultaneous and unique requestor selection during the same clock cycle.

Figure 3:
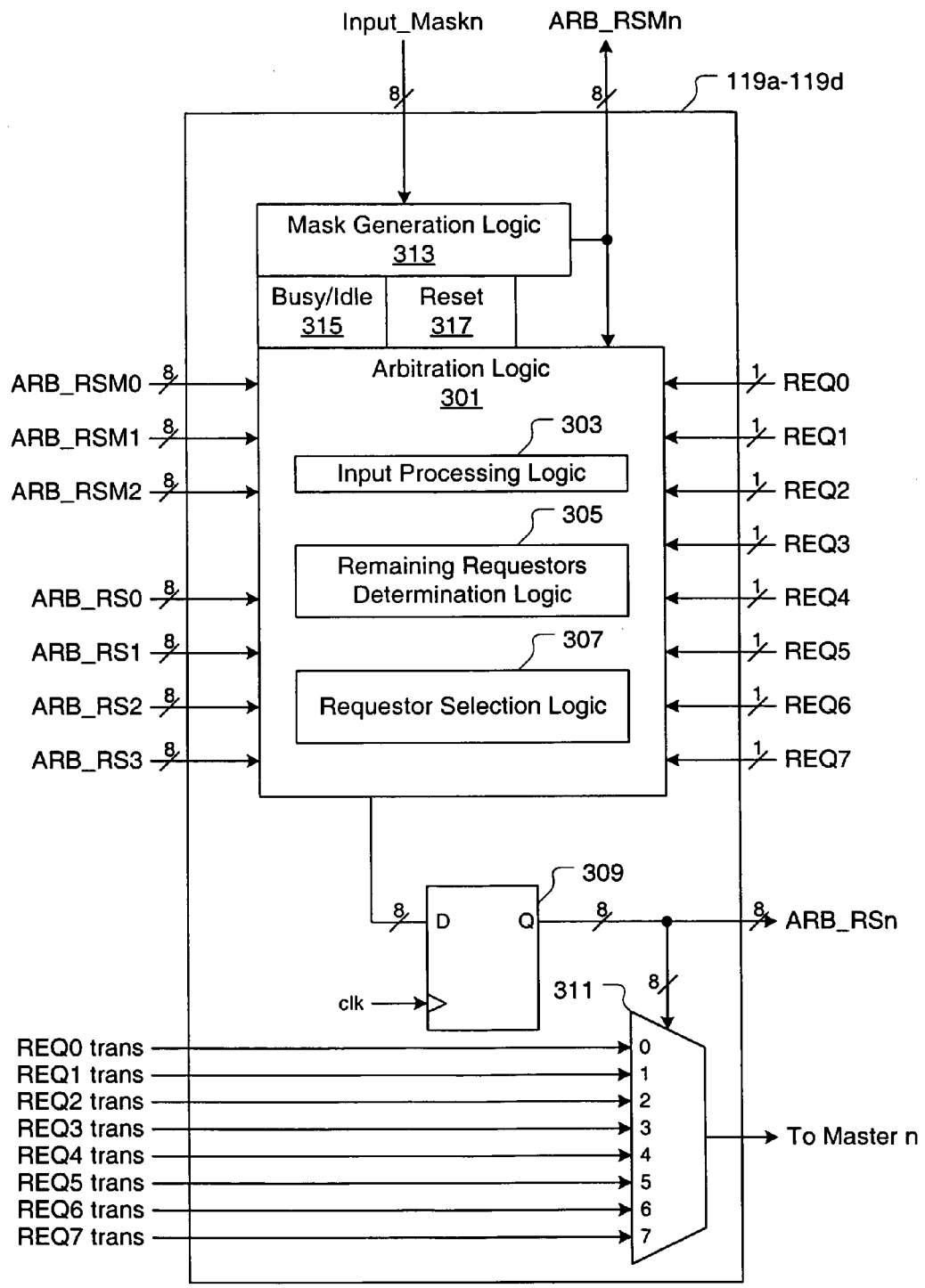
FIG. 3 is an illustration showing an internal configuration of each arbitrator, in accordance with one embodiment of the present invention.

FIG. 3 is an illustration showing an internal configuration of each arbitrator 119*a*-119*d*, in accordance with one embodiment of the present invention. It should be understood that the arbitrator configuration depicted in FIG. 3 is generalized to an arbitrator "n" that provides requestor selection for a master "n." As previously discussed with respect to FIG. 2, each arbitrator is defined to receive a transmission from each requestor, i.e., from each read DMA engine of the SAS controllers 107*a*-107*d*. The transmission received from each requestor includes two components. A first component identifies whether or not a request is currently being made by the requestor. A second component represents the data corresponding to the request being made by the requestor.

With respect to FIG. 3, the first component of the transmission received from each requestor is respectively represented as input REQ0 through REQ7. In one embodiment, each input REQ0 through REQ7 is a one bit signal indicating requestor activity. Thus, each input REQ0 through REQ7 indicates whether or not a request is current being made by the corresponding requestor. In this embodiment, a high signal, i.e., "1", indicates that a request is currently being made, and a low signal, i.e., "0", indicates that a request is not being made. The second component of the transmission received from each requestor is respectively represented as input "REQ0 trans" through "REQ7 trans." Each input "REQ0 trans" through "REQ7 trans" is communicated as an input to a multiplexer 311 within the arbitrator 119*a*-119*d*. The multiplexer 311 is described in more detail below.

The arbitrator 119*a*-119*d* is also defined to receive as input each of the requestor selection masks (ARB_RSM0, ARB_RSM1, ARB_RSM2) as communicated from the higher level arbitrators. However, it should be appreciated that because arbitrator 0 (119*a*) is the highest level arbitrator in the arbitrator hierarchy, arbitrator 0 (119*a*) will not receive requestor selection mask input from any other arbitrators. Thus, the inputs ARB_RSM0, ARB_RSM1, and ARB_RSM2 are not connected in arbitrator 0 (119*a*). Similarly, arbitrator 1 (119*b*) is connected to receive the ARB_RSM0 input, but not the ARB_RSM1 and ARB_RSM2 inputs. Arbitrator 2 (119*c*) is connected to receive the ARB_RSM0 and ARB_RSM1 inputs, but not the ARB_RSM2 input. Because arbitrator 3 (119*d*) represents the lowest level in the arbitrator hierarchy, arbitrator 3 (119*d*) is connected to receive each of the ARB_RSM0, ARB_RSM1, and ARB_RSM2 inputs.

As previously discussed, each of the requestor selection mask inputs is defined by a number of bits equal to the number of requestors, i.e., the number of read DMA engines. Thus, in the present embodiment, each of the inputs ARB_RSM0, ARB_RSM1, and ARB_RSM2 is defined by eight bits, wherein each bit corresponds to a respective requestor. A high signal for a given bit in the requestor selection mask input ARB_RSMn indicates that the requestor corresponding to the given bit is included in the set of requestors that the arbitrator n can consider for selection. For example, if bit 5 is high in ARB_RSM2, requestor 5 is included within the set of requestors that arbitrator 2 (119*c*) can consider for selection.

The arbitrator 119*a*-119*d* is further defined to receive as input the identities of each selected requestor that is currently registered by each arbitrator. For ease of discussion, the selected requestors that are currently registered by each arbitrator will be referred to as registered selections, hereafter. As previously discussed the registered selections are communicated as bit-masks ARB_RS0, ARB_RS1, ARB_RS2, and ARB_RS3. Thus, each of the registered selection inputs is defined by a number of bits equal to the number of requestors, i.e., the number of read DMA engines. In the present embodiment, each of the inputs ARB_RS0, ARB_RS1, ARB_RS2, and ARB_RS3 is defined by eight bits, wherein each bit corresponds to a respective requestor. A high signal for a given bit in the registered selection input indicates that the requestor corresponding to the given bit has been selected in a previous clock cycle, and remains selected, for servicing by the arbitrator providing the registered selection input. For example, if bit 3 is high in ARB_RS3, the arbitrator 3 (119*d*) continues to have requestor 3 registered as being selected for servicing. Thus, master 3 is servicing requestor 3.

Within the arbitrator 119*a*-119*d*, each of the inputs REQ0 through REQ7, ARB_RSM0 through ARB_RSM2, and ARB_RS0 through ARB_RS3, as described above, is received by arbitration logic 301. The arbitration logic 301 is defined to select one of the requestors to be serviced by the master associated with the arbitrator. If the master associated with the arbitrator is not busy servicing a requestor, the arbitration logic 301 will function to select a requestor to be serviced by the master. Thus, the number of requestors that can be simultaneously serviced is equal to the number of masters.

The arbitration logic 301 includes input processing logic 303, remaining requestors determination logic 305, and requestor selection logic 307. The detailed functionality of the arbitration logic 301 is described below with respect to each of the input processing logic 303, remaining requestors determination logic 305, and requestor selection logic 307. However, for the immediate discussion, it should be understood that at each clock cycle the arbitration logic 301 outputs an identifier of the requestor selected to be serviced by the associated master, assuming that the master is not already busy servicing a requestor at the clock cycle. The output of the arbitration logic 301 is defined by a number of bits equal to the number of requestors, i.e., the number of read DMA engines. Thus, in the present embodiment, output of the arbitration logic 301 is defined by eight bits, wherein each bit corresponds to a respective requestor. A high signal for a given bit in the output of the arbitration logic 301 indicates that the requestor corresponding to the given bit has been selected to be serviced by the master. For example, if bit 3 is high in the output of the arbitration logic 301, requestor 3 is selected to be serviced by the master. It should be understood that the arbitration logic 301 is defined such that only one requestor can be selected for servicing by the master at a given time.

The output of the arbitration logic 301 is transmitted to a flip-flop 309. Then, at the next clock cycle, the output of the arbitration logic 301 from the previous clock cycle is output from the flip-flop 309 as the registered selection output for the arbitrator. Thus, the output of the flip-flop 309 is provided as the registered selection output ARB_RSn for the arbitrator "n." It should be appreciated that upon selecting a requestor to be serviced by the associated master, the arbitration logic 301 enters a busy state for the duration required to complete servicing of the selected requestor. In one embodiment, the busy state is identified by setting a busy/idle bit 315 within the arbitration logic 301. A high state of the busy/idle bit 315 indicates that the master associated with the arbitrator is busy servicing a requestor. Correspondingly, a low state of the busy/idle bit 315 indicates that the master associated with the arbitrator is idle. During the busy state, the arbitration logic 301 does not provide output, and the requestor selection registered in the flip-flop 309 remains unchanged. Accordingly, the registered selection output ARB_RSn for the arbitrator remains unchanged during the busy state. Therefore, communication of the registered selection ARB_RSn to each other arbitrator continues for the duration required to complete servicing of the selected requestor, thus ensuring that selection of the same requestor by multiple arbitrators is avoided. Once the servicing of the requestor is completed, the busy/idle bit 315 is set to idle, i.e., low state, and the arbitration logic 301 again provides output.

The registered selection as output from the flip-flop 309 is also used as a select signal to the multiplexer 311. The registered selection includes a single high bit corresponding to the one requestor that is currently selected for servicing by the master associated with the arbitrator. The single high bit corresponding to the currently selected requestor will allow the transmission from the currently selected requestor, i.e., one of "REQ0 trans" through "REQ7 trans", to pass through the multiplexer 311 to the master for servicing.

Each arbitrator 119*a*-119*d* also includes mask generation logic 313 defined to generate the requestor selection mask ARB_RSMn for arbitrator n. The mask generation logic 313 receives as input a signal from the busy/idle bit 315, a signal from a reset bit 317, and a bit-mask denoted as Input_Maskn, where n corresponds to the arbitrator number in the arbitrator hierarchy. As previously discussed, the signal from the busy/idle bit 315 indicates whether or not the master associated with the arbitrator is currently busy servicing a requestor. A high state of the busy/idle bit 315 indicates a busy condition, and a low state indicates an idle condition. The signal provided by the reset bit 317 indicates whether the arbitrator is being reset. A high state, i.e., 1, of the reset bit 317 indicates a reset condition, and low state, i.e., 0, indicates a normal operating condition.

The Input_Maskn represents a starting requestor selection mask for arbitrator n. Thus, each requestor is represented by a different bit in the Input_Maskn bit-mask. A high state for a given bit in the Input_Maskn means that the requestor corresponding to the given bit is included within the set of requestors from which the arbitrator n is allowed to make a selection. A low state for a given bit in the Input_Maskn means that the requestor corresponding to the given bit is not included within the set of requestors from which the arbitrator n is allowed to make a selection. The Input_Maskn is output as ARB_RSMn by the mask generation logic 313 if the signal from the reset bit 317 indicates a reset condition and the signal from the busy/idle bit 315 indicates an idle condition. It should be appreciated that the Input_Maskn for each arbitrator n is fixed such that each arbitrator will initially be looking at a different portion of the requestors such that each requestor is visible to the arbitrators. For example, if there are 18 requestors and 3 arbitrators, the Input_Maskn will allow each arbitrator to look at 6 requests at a time; thus, making 3 different sets of 6 requestors each. In the example embodiment of FIG. 1, there are 8 requestors and 4 arbitrators. Thus, arbitrator 0 (119*a*) will look at requestors 0-1, arbitrator 1 (119*b*) will look at requestors 2-3, arbitrator 2 (119*c*) will look at requestors 4-5, and arbitrator 3 (119*d*) will look at requestors 6-7.

Figure 4A:
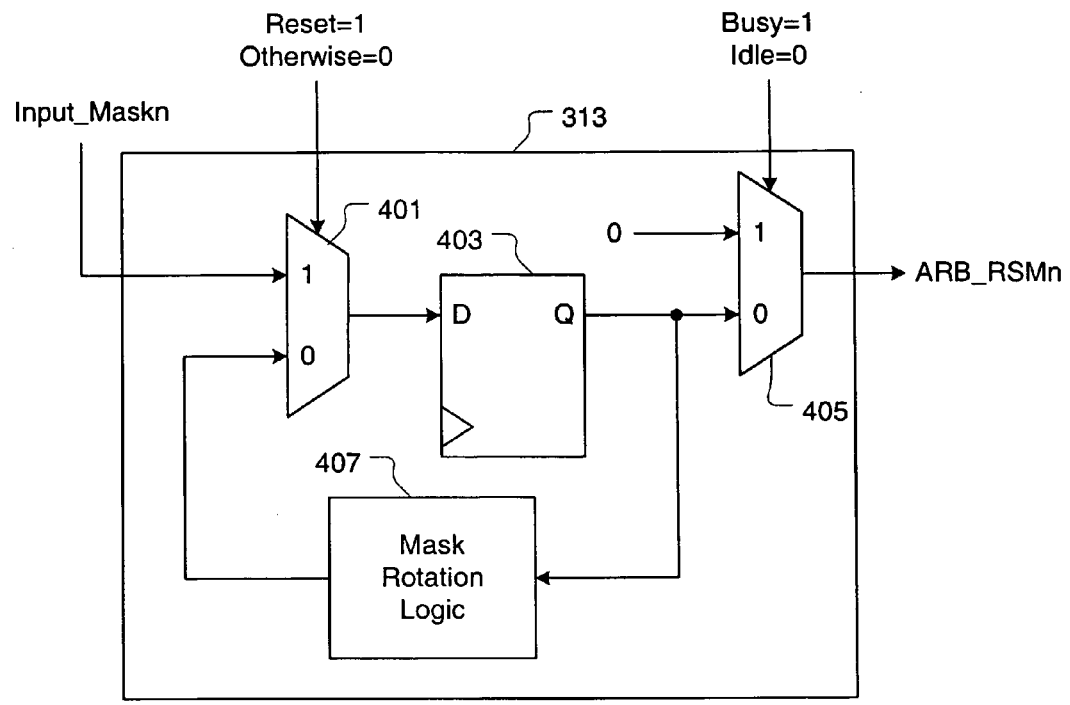
FIG. 4A is an illustration showing the mask generation logic, in accordance with one embodiment of the present invention.

FIG. 4A is an illustration showing the mask generation logic 313, in accordance with one embodiment of the present invention. As discussed above, the mask generation logic 313 receives as input each of the Input_Maskn, the signal from the reset bit 317, and the signal from the busy/idle bit 315. The Input_Maskn is provided as an input to a multiplexer 401. The multiplexer 401 also receives as an input a rotated version of the Input_Maskn from mask rotation logic 407. The mask rotation logic 407 is described further below. The signal received from the reset bit 317 is used as a select signal for the multiplexer 401. If the reset signal is high to indicate that a reset condition exists, the multiplexer 401 will output the Input_Maskn. Otherwise, if the reset signal is low to indicate that a reset condition does not exist, the multiplexer 401 will output the rotated version of the Input_Maskn as received from the mask rotation logic 407.

The bit-mask as output from the multiplexer 401 is registered within a flip-flop 403 at each clock cycle. It should be appreciated that the flip-flop 403 is capable of registering a number of bits corresponding to the received input. Thus, the flip-flop 403 is defined to register a number of bits equal to the number of requestors. Also, the bit-mask currently registered in the flip-flop 403 is output at a subsequent clock cycle. The bit-mask output from the flip-flop 403 is provided as an input to both a multiplexer 405 and the mask rotation logic 407. The multiplexer 405 is also defined to receive a zero input, wherein the zero input corresponds to a bit-mask having the same number of bits as the number of requestors, with each bit having a low state or zero. The signal received from the busy/idle bit 315 is used as a select signal for the multiplexer 405. If the busy/idle signal is high to indicate that a busy condition exists, the multiplexer 405 will output the zero input. Otherwise, if the reset signal is low to indicate that an idle condition exists, the multiplexer 405 will output the bit-mask as received from the flip-flop 403. The bit-mask output of the multiplexer 405 is provided as the output of the mask generation logic 313, i.e., as the ARB_RSMn signal previously discussed.

Figure 4B:
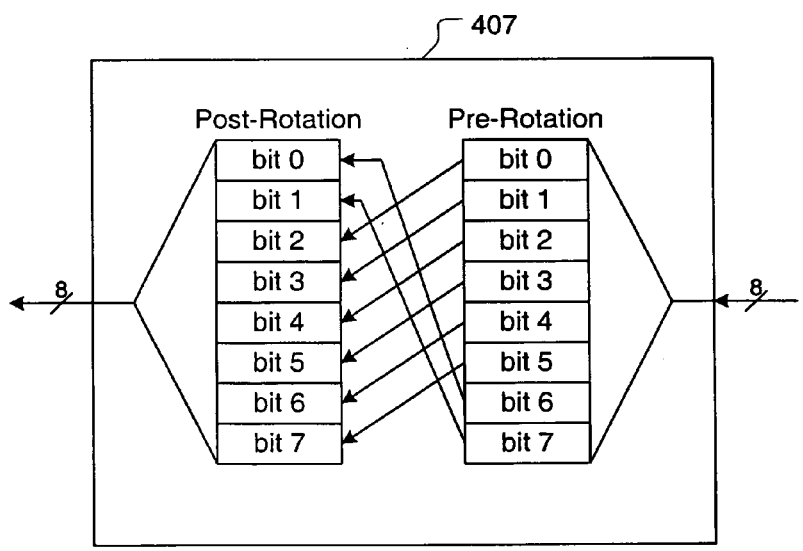
FIG. 4B is an illustration showing the mask rotation logic, in accordance with one embodiment of the present invention.

FIG. 4B is an illustration showing the mask rotation logic 407, in accordance with one embodiment of the present invention. The mask rotation logic 407 is defined to receive a first bit-mask as an input and output a second bit-mask representing a rotated version of the first bit-mask. In the present example the first bit mask is rotated by two bit positions to generate the second bit-mask. More specifically, bits 0 through 5 of the first bit-mask are moved to bits 2 through 7 in the second bit-mask, respectively. Also, bits 6 through 7 of the first bit-mask are moved to bits 0 through 1 in the second bit-mask, respectively. The number of bits by which the first bit-mask is rotated to generated the second bit-mask is determined based on the ratio of the number of requestor to the number of masters. In the present example there are eight requestors and four masters. Therefore, the first bit-mask is rotated by two bits to generate the second bit-mask.

The mask generation logic 313 represented in FIGS. 4A-4B represents one embodiment by which the functionality of the mask generation logic 313 can be implemented. It should be appreciated that the functionality of the mask generation logic 313 as described above can be implemented in a number of alternative ways using different digital logic structures and connectivity. The present invention is intended to include all possible digital logic structures and connectivity that can be used to implement the mask generation logic 313 functionality as described above with respect to FIGS. 4A-4B.

Figure 5:
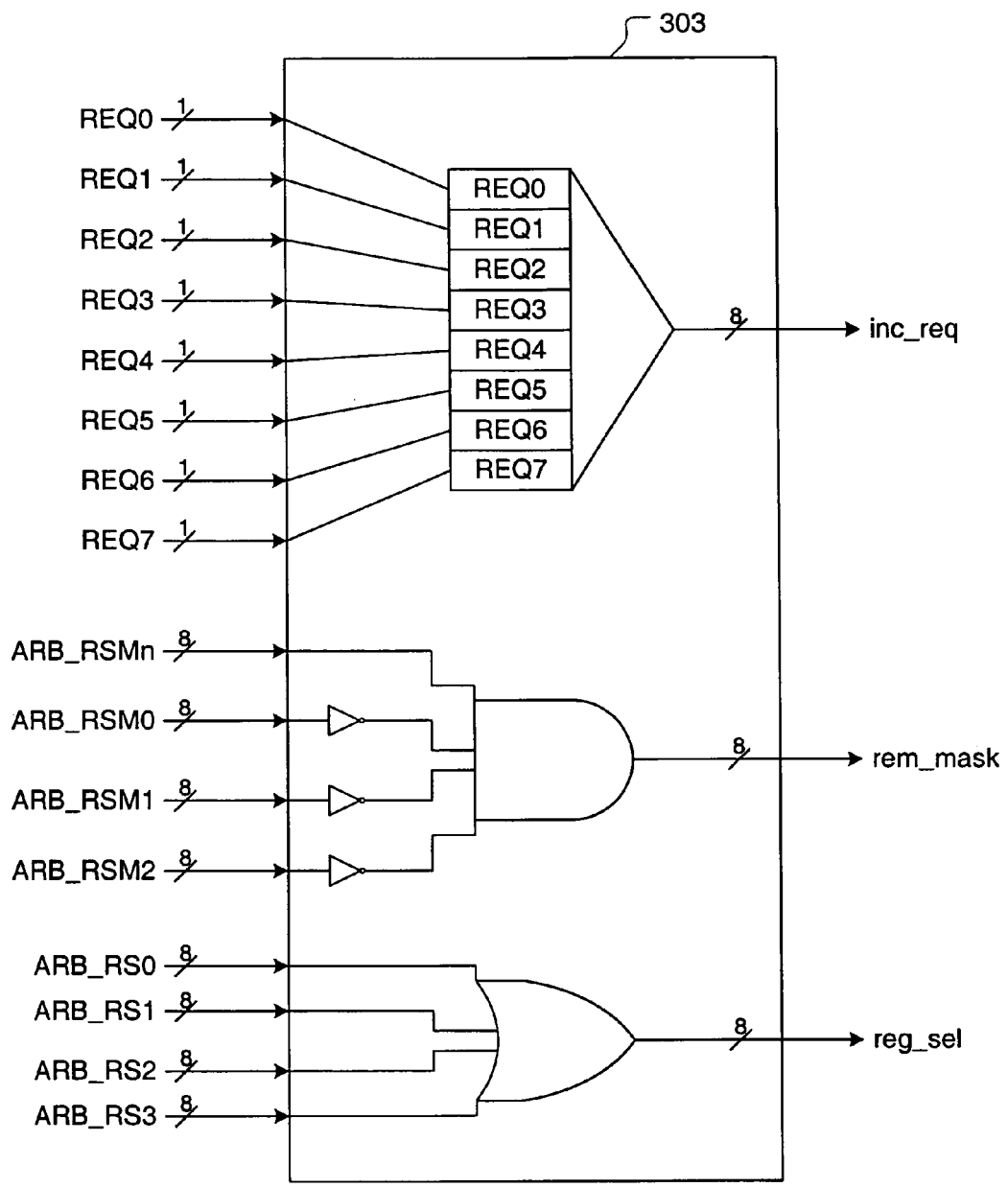
FIG. 5 is an illustration showing the input processing logic, in accordance with one embodiment of the present invention.

FIG. 5 is an illustration showing the input processing logic 303, in accordance with one embodiment of the present invention. As previously discussed, each input REQ0 through REQ7 is a one bit signal indicating whether or not a request is current being made by the associated requestor, wherein a high signal, i.e., "1", indicates that a request is currently being made, and a low signal, i.e., "0", indicates that a request is not being made. The input processing logic 303 receives each of the REQ0 through REQ7 signals and concatenates them into a multi-bit signal called "inc_req", which refers to incoming requests. Since there are eight requestors in the exemplary embodiment, the inc_req signal is defined as an eight bit signal.

The input processing logic 303 is defined to perform a bit-wise AND operation on the requestor selection mask ARB_RSMn as output from the mask generation logic 313 of the current arbitrator and the inversion of the requestor selection mask from each higher level arbitrator in the arbitrator hierarchy. The bit-wise AND operation generates a multi-bit signal called "rem_mask", which refers to remaining requestors mask. The rem_mask signal identifies the requestors that the arbitrator is permitted to consider for selection. More specifically, the arbitrator is permitted to consider for selection each requestor whose corresponding bit has a high state in the rem_mask signal.

It should be appreciated that the inputs to the bit-wise AND operation vary depending on the location of the arbitrator in the arbitrator hierarchy. For arbitrator 0 (119*a*), the requestor selection mask ARB_RSMn as output from the mask generation logic 313 of arbitrator 0 (119*a*) is the only input to the AND operation. For arbitrator 1 (119*b*), the requestor selection mask ARB_RSMn as output from the mask generation logic 313 of arbitrator 1 (119*b*) and the inversion of the requestor selection mask ARB_RSM0 are inputs to the AND operation. For arbitrator 2 (119*c*), the requestor selection mask ARB_RSMn as output from the mask generation logic 313 of arbitrator 2 (119*c*), the inversion of the requestor selection mask ARB_RSM0, and the inversion of the requestor selection mask ARB_RSM1 are inputs to the AND operation. For arbitrator 3 (119*d*), the requestor selection mask ARB_RSMn as output from the mask generation logic 313 of arbitrator 3 (119*d*), the inversion of the requestor selection mask ARB_RSM0, the inversion of the requestor selection mask ARB_RSM1, and the inversion of the requestor selection mask ARB_RSM2 are inputs to the AND operation.

The input processing logic 303 is also defined to receive each of the registered requestor selections for each arbitrator as indicated by ARB_RS0, ARB_RS1, ARB_RS2, and ARB_RS3. The input processing logic 303 performs a bit-wise OR operation on each registered requestor selection input (ARB_RS0, ARB_RS1, ARB_RS2, ARB_RS3) to generate a multi-bit signal called "reg_sel", which refers to registered requestor selections. For example, with arbitrator 1 (119*b*), bit 0 of each input ARB_RS0, ARB_RS1, ARB_RS2, and ARB_RS3 is OR'd together to generate bit 0 of reg_sel. Similarly, bit 1 of each input ARB_RS0, ARB_RS1, ARB_RS2, and ARB_RS3 is OR'd together to generate bit 1 of reg_sel, and so on. Since there are eight requestors in the exemplary embodiment, each of the inputs ARB_RS0, ARB_RS1, ARB_RS2, and ARB_RS3 and the reg_sel signal is defined as an eight bit signal.

A high signal for a given bit in the registered selection input (ARB_RS0, ARB_RS1, ARB_RS2, ARB_RS3) indicates that the requestor corresponding to the given bit has been selected for servicing in a previous clock cycle by the corresponding arbitrator, and remains registered as being selected for servicing by the corresponding arbitrator. Therefore, it should be appreciated that if a requestor has been selected for servicing in a previous clock cycle by a given arbitrator and remains registered as being selected for servicing by the given arbitrator, the corresponding requestor bit in the reg_sel signal will be high. Otherwise, the corresponding requestor bit will be low. Thus, the high bits in the reg_sel signal represent the requestors that have been selected for servicing in a previous clock cycle and continue to be serviced.

Figure 6:
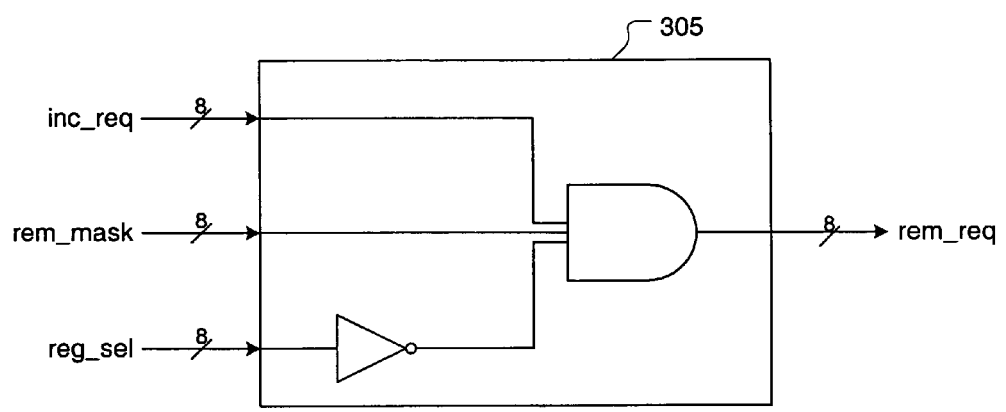
FIG. 6 is an illustration showing the remaining requestors determination logic, in accordance with one embodiment of the present invention.

FIG. 6 is an illustration showing the remaining requestors determination logic 305, in accordance with one embodiment of the present invention. The remaining requestors determination logic 305 receives as input each of the inc_req, rem- _mask, and reg_sel signals generated by the input processing logic 303. The remaining requestors determination logic 305 is defined to perform a bit-wise AND operation on the inc_req signal, the rem_mask signal, and an inversion of the reg_sel signal. More specifically, each bit in the inc_req signal is AND'd with the corresponding bit in the rem_mask signal and is also AND'd with an inverted state of the corresponding bit in the reg_sel signal. The output of the bit-wise AND operation performed by the remaining requestors determination logic 305 defines a signal "rem_req", which represents the remaining requestors available for selection by the particular arbitrator within which the arbitration logic 301 resides.

As each requestor is represented by a respective bit in each of the inc_req, rem_mask, and reg_sel signals, so is each requestor represented by the corresponding respective bit in the rem_req signal. Thus, in the present exemplary embodiment having eight requestors, the rem_req signal is defined by eight bits. According to the remaining requestors determination logic 305, a particular requestor will be identified as being available for selection in the present clock cycle by setting its corresponding bit in the rem_req signal to a high state, if the following criteria are satisfied:
 the particular requestor is transmitting a request in the present clock cycle,
 the particular requestor is indicated in the present clock cycle as being visible to the present arbitrator for selection consideration and not visible to any other higher level arbitrator for selection consideration, and
 the particular requestor is not continuing to be serviced from a selection made in a previous clock cycle.

Figure 7:
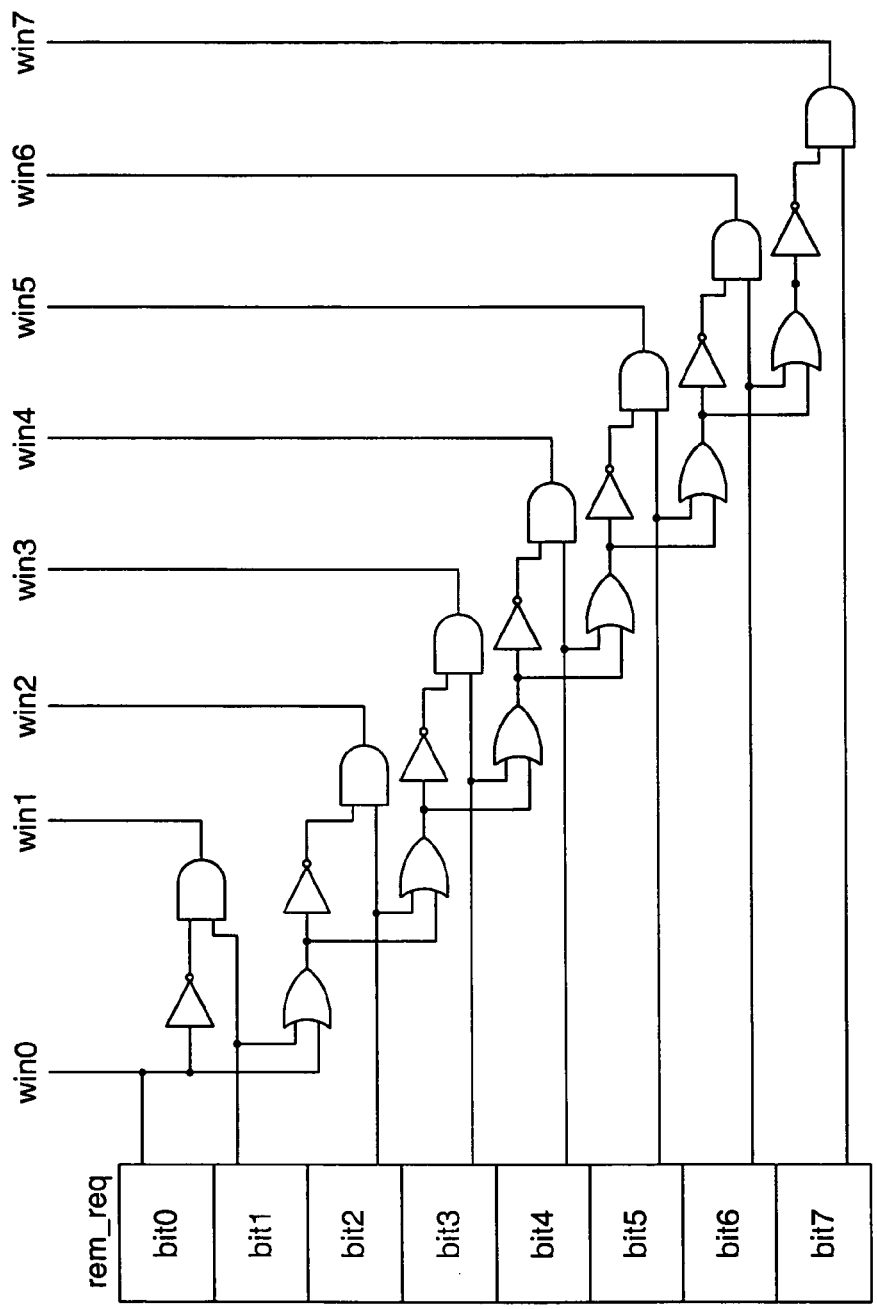
FIG. 7 is an illustration showing the requestor selection logic, in accordance with one embodiment of the present invention.

FIG. 7 is an illustration showing the requestor selection logic 307, in accordance with one embodiment of the present invention. The requestor selection logic 307 is defined to process the rem_req signal to determine which requestor is to be selected for servicing by the arbitration logic 301. The requestor selection logic 307 essentially identifies the lowest bit of the rem_req signal having a high state. The requestor selection logic 307 identifies the requestor corresponding to the identified lowest high state bit of the rem_req signal as the requestor to be selected by the arbitration logic 301 for servicing.

The identification of which requestor is selected and which requestors are not selected for servicing is represented by signals win0 through win7 (collectively referred to as "win" signals), wherein each win signal corresponds to a respective requestor. A high state of a particular win signal indicates that the requestor corresponding to the particular win signal is selected by the arbitration logic 301 for servicing in the present clock cycle. It should be appreciated that because the present exemplary embodiment includes eight requestors, there are eight win signals. It should be further appreciated that the requestor selection logic 307 is defined such that one win signal can have a high state in a given clock cycle, thus one requestor can be identified as being selected for servicing in a given clock cycle. Each win signal is concatenated together to form the output signal of the arbitration logic 301. Thus, the concatenated win signals define the ARB_RSn output of the each arbitrator 119a-119d.

The functionality of the requestor selection logic 307 is described by the following pseudocode, wherein numbers indicated in brackets [ ] correspond to bits in the rem_req signal:
 win0=rem_req[0];
 win1=rem_req[1] AND
 NOT (rem_req[0]);
 win2=rem_req[2] AND
 NOT (rem_req[0] OR
   rem_req[1]);
 win3=rem_req[3] AND
 NOT (rem_req[0] OR
   rem_req[1] OR
   rem_req[2]);
 win4=rem_req[4] AND
 NOT (rem_req[0] OR
   rem_req[1] OR
   rem_req[2] OR
   rem_req[3]);
 win5=rem_req[5] AND
 NOT (rem_req[0] OR
   rem_req[1] OR
   rem_req[2] OR
   rem_req[3] OR
   rem_req[4]);
 win6=rem_req[6] AND
 NOT (rem_req[0] OR
   rem_req[1] OR
   rem_req[2] OR
   rem_req[3] OR
   rem_req[4] OR
   rem_req[5]);
 win7=rem_req[7] AND
 NOT (rem_req[0] OR
   rem_req [1] OR
   rem_req[2] OR
   rem_req[3] OR
   rem_req[4] OR
   rem_req[5] OR
   rem_req[6]).

Based on the above description of arbitrators 119a-119d, it can be seen that the requestor represented by the lowest bit (bit 0) in the rem_req signal will be most favored for selection, while the requestor represented by the highest bit (bit 7 in the present exemplary embodiment) will be least favored for selection. Thus, a fixed priority exists with respect to requestor selection by the arbitrators 119a-119d. To avoid having certain requestors favored more for servicing selection, a fairness embodiment of the present invention is also provided.

Figure 8:
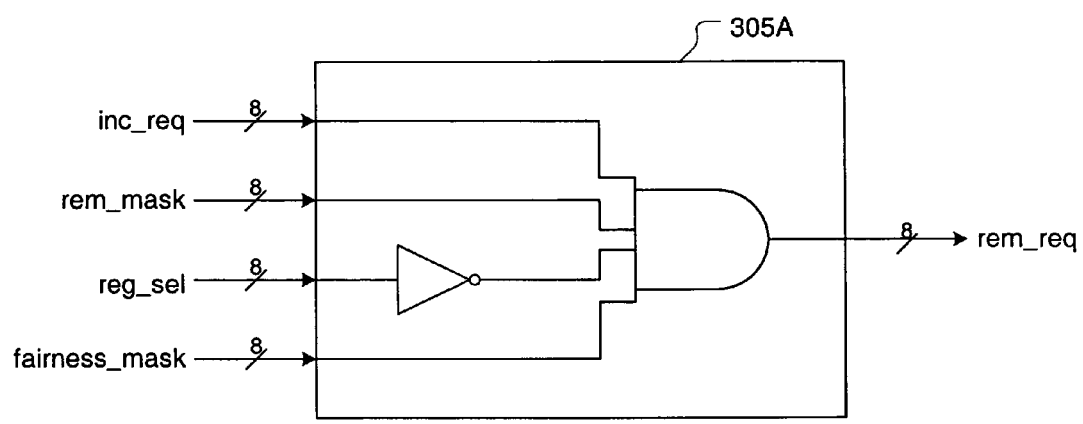
FIG. 8 is an illustration showing the remaining requestors determination logic as modified to incorporate the fairness embodiment, in accordance with one embodiment of the present invention.

FIG. 8 is an illustration showing the remaining requestors determination logic 305A as modified to incorporate the fairness embodiment, in accordance with one embodiment of the present invention. The remaining requestors determination logic 305A receives as input each of the inc_req, rem_mask, and reg_sel signals as previously discussed with respect to the remaining requestors determination logic 305 of FIG. 6. However, the remaining requestors determination logic 305A is also defined to receive an input called fairness_mask. The fairness_mask input is a bit-mask including a respective bit for each requestor. A high state of a given bit in the fairness_mask indicates that from a requestor selection fairness perspective, selection of the requestor corresponding to the given bit is considered fair. Therefore, it follows that the remaining requestors determination logic 305A is defined to perform a bit-wise AND operation on the inc_req signal, the rem_mask signal, an inversion of the reg_sel signal, and the fairness_mask signal. More specifically, each bit in the inc_req signal is AND'd with the corresponding bit in the rem_mask signal, and is also AND'd with an inverted state of the corresponding bit in the reg_sel signal, and is also AND'd with the corresponding bit in the fairness_mask signal. The output of the bit-wise AND operation performed by the remaining requestors determination logic 305A defines the "rem_req" signal, which represents the remaining requestors available for selection by the particular arbitrator within which the arbitration logic 301 resides.

According to the remaining requestors determination logic 305A, a particular requestor will be identified as being available for selection in the present clock cycle by setting its corresponding bit in the rem_req signal to a high state, if the following criteria are satisfied:

the particular requestor is transmitting a request in the present clock cycle, the particular requestor is indicated in the present clock cycle as being visible to the present arbitrator for selection consideration and not visible to any other higher level arbitrator for selection consideration, the particular requestor is not continuing to be serviced from a selection made in a previous clock cycle, and the particular requestor is indicated as being a fair selection within the fairness_mask.

The fairness_mask is defined and maintained based on the operating conditions of the arbitrators 119a-119d. The fairness_mask definition and maintenance is described below using conditional logic. It should be appreciated, however, that the conditional logic described below can be implemented as hardware within each of the arbitrators 119a-119d. To begin describing the conditional logic associated with the fairness_mask, it is necessary to define a conditional parameter referred to as FSEL. The FSEL parameter is represented as a single bit signal that can have either a high state or a low state. The FSEL parameter/signal has a high state when the busy/idle bit 315 has a high state AND any "win" signal (win0 through win7) has a high state. Otherwise, the FSEL parameter/signal has a low state. For discussion purposes, the FSEL parameter/signal will be referred to as the FSEL signal hereafter.

Once the FSEL signal is available, the following conditional logic can be used to define and maintain the fairness_mask:

IF (reset=high OR fairness_mask=0) THEN
fairness_mask=1
ELSEIF (fairness_mask=1 AND FSEL=high) THEN
fairness_mask=rem_req AND NOT(win0 . . . win7)
ELSEIF (FSEL=high) THEN
fairness_mask=fairness_mask AND NOT(win0 . . . win7)
ELSEIF (busy/idle=high) THEN
fairness_mask=fairness_mask AND NOT(reg_sel)
ENDIF.

With respect to the conditional logic above, the "IF (reset=high OR fairness_mask=0) THEN fairness_mask=1" entry means that if the master is reset OR the fairness_mask is all zeros/low states, the fairness_mask will be reset to all ones/high states. The reset term corresponds to the state of the reset bit 317 of the arbitrator.

With respect to the conditional logic above, the "ELSEIF (fairness_mask=1 AND FSEL=high) THEN fairness_mask=rem_req AND NOT(win0 . . . win7)" entry means that if all bits in the fairness_mask have a high state AND the FSEL signal has a high state, the fairness_mask will be updated to reflect a high state for each bit corresponding to a requestor that is both available for selection as indicated by rem_req and is not currently selected as indicated by win0 through win7.

With respect to the conditional logic above, the "ELSEIF (FSEL=high) THEN fairness_mask=fairness_mask AND NOT(win0 . . . win7)" entry means that if a requestor selection has been made, the fairness_mask will be updated to reflect a high state for each bit of the fairness_mask that currently has a high state AND does not correspond to the currently selected requestor as indicated by win0 through win7. It should be appreciated that this condition will be reached in each clock cycle unless the fairness_mask is all zeros or a reset signal is received. Thus, as the clock cycles, the bit in the fairness_mask corresponding to each selected requestor will be flipped from one to zero (from high to low). Therefore, the fairness_mask will prevent each requestor that has been selected for servicing from being selected again until all other requestors have been selected for servicing or until a reset signal has been received.

With respect to the conditional logic above, the "ELSEIF (busy/idle=high) THEN fairness_mask=fairness_mask AND NOT(reg_sel)" entry means that if the master is busy servicing a selected requestor as indicated by a high state of the busy/idle bit 315, the fairness_mask will be updated to reflect a high state for each bit of the fairness_mask that currently has a high state AND does not correspond to a requestor that has been selected for servicing by any other arbitrator. Therefore, if the master is busy servicing a requestor, the fairness_mask for the arbitrator associated with the master will be updated based on the requestor selections made by the other arbitrators. If any arbitrator selects a particular requestor to be serviced, the bit corresponding to the particular requestor in the reg_sel signal will be set to a high state. Thus, the corresponding bit for the particular requestor in the fairness_mask will be set to a low state. Also, if the bit for a particular requestor in the fairness_mask has already been set to a low state, the bit will stay set to a low state.

In accordance with the foregoing description, the present invention provides an apparatus for arbitration between multiple requestors and multiple masters such that a requestor can be selected for each master during a single clock cycle. In one embodiment, the present invention can be defined as a circuit for handling multiple requestors desiring access to a resource. The circuit of this embodiment includes a plurality of masters and a plurality of arbitrators. Each arbitrator is assigned to a different one of the plurality of masters. Also, each arbitrator is defined to consider a different portion of the multiple requestors when selecting a requestor to be serviced by the master to which the arbitrator is assigned. Furthermore, each arbitrator is defined to select a requestor from the different portion of the multiple requestors in a same clock cycle such that selection of a particular requestor is not duplicated among the plurality of arbitrators.

Each of the plurality of arbitrators is defined to generate a first signal that identifies which of the multiple requestors defines the different portion of the multiple requestors to be considered for selection. With respect to the description above, the first signal is analogous to the requestor selection mask ARB_RSMn as output from the mask generation logic 313. Additionally, each arbitrator is defined to communicate the first signal to each lower level arbitrator in the arbitrator hierarchy to enable each lower level arbitrator to identify the different portion of the multiple requestors to be considered for selection. With respect to the description above, communication of the first signal to each lower level arbitrator is indicated by the ARB_RSM0, ARB_RSM1, and ARB_RSM2 inputs to the arbitrator.

Each of the plurality of arbitrators is also defined to generate a second signal that identifies a final set of requestors to be considered for selection. With respect to the description above, the second signal is analogous to the rem_req signal generated by the remaining requestors determination logic 305. Thus, each requestor in the final set of requestors is currently transmitting a request, is included in the different portion of the multiple requestors to be considered for selection as identified by the first signal, and is not currently being serviced by either of the plurality of masters. According to the requestor selection logic 307 described above, each of the plurality of arbitrators is defined to select a most significant requestor from within the final set of requestors to be serviced by the master to which the arbitrator is assigned.

In accordance with the fairness embodiment previously discussed, it should be appreciated that each requestor in the final set of requestors is identified by a fairness signal, i.e., fairness_mask, as having a fair selection status, as indicated by the remaining requestors determination logic 305A of FIG. 8. The fairness signal indicates that each requestor not yet selected for servicing has a fair selection status, and each requestor that has been selected for servicing does not have a fair selection status. Additionally, each arbitrator is defined to reset the fairness signal to indicate that all requestors have a fair selection status when either a reset instruction is received by the arbitrator, i.e., the reset bit 317 indicates a reset state, or when the fairness signal indicates that all requestors do not have a fair selection status, i.e., the fairness_mask equals zero.

Each arbitrator is defined to register (via flip-flop 309) the requestor that is selected for servicing. Each arbitrator is also defined to direct (via multiplexer 311) its master to service the registered requestor following the clock cycle in which the requestors are selected by each arbitrator. Each arbitrator is further defined to communicate the registered requestor to each other arbitrator during servicing of the registered requestor by its master. With respect to the discussion above, the registered requestor is communicated from the arbitrator as the ARB_RSn signal. Also, because the arbitration logic 301 is idled during servicing of the selected requestor, the ARB_RSn signal remains unchanged for the duration of the selected requestor's servicing.

In another embodiment, the present invention can be represented as an interface circuit defined to connect a plurality of requestors to a plurality of masters. The interface circuit in this embodiment includes a plurality of arbitrators being respectively assigned to the plurality of masters. Each of the plurality of arbitrators is defined to select in a same clock cycle a different one of the plurality of requestors to be serviced by its master. To enable this functionality, each of the plurality of arbitrators includes mask generation logic 313, input processing logic 303, remaining requestors determination logic 305, and requestor selection logic 307.

As previously discussed, the mask generation logic 313 is defined to generate a bit-mask that identifies a subset of the plurality of requestors that the arbitrator is allowed to consider for selection. The arbitrator is defined to communicate the bit-mask generated by the mask generation logic 313 to each lower level arbitrator, as indicated by input signals ARB_RSM0, ARB_RSM1, and ARB_RSM2 in FIG. 3.

As previously discussed with respect to FIG. 5, the input processing logic 303 is defined to receive the bit-masks generated by the higher level arbitrators (ARB_RSM0, ARB_RSM1, ARB_RSM2). The input process logic 303 is also defined to compare the received bit-masks to the bit-mask generated by the mask generation logic 313 of the given arbitrator (ARB_RSMn) to establish a set of requestors that can be considered for selection by the given arbitrator and are not considered for selection by higher level arbitrators. The set of arbitrators that can be considered for selection by the given arbitrator is identified by the rem_mask signal.

As previously discussed with respect to FIG. 6, the remaining requestors determination logic 305 is defined to identify a final set of requestors to be considered for selection, as identified by the rem_req signal. Due to the inc_req signal, the remaining requestors determination logic 305 requires that each requestor in the final set of requestors be currently transmitting a request. Also, due to the rem_mask signal, the remaining requestors determination logic 305 requires that each requestor in the final set of requestors be included in the set of requestors that can be considered for selection by the given arbitrator and are not considered for selection by higher level arbitrators. Furthermore, due to the reg_sel signal, the remaining requestors determination logic 305 requires that each requestor in the final set of requestors not be currently serviced by either of the plurality of masters. As previously discussed with respect to the requestor selection logic 307 of FIG. 7, each of the plurality of arbitrators is defined to select a most significant requestor, from within the final set of requestors as indicated by the rem_req signal, to be serviced by the master to which the arbitrator is assigned.

Figure 9:
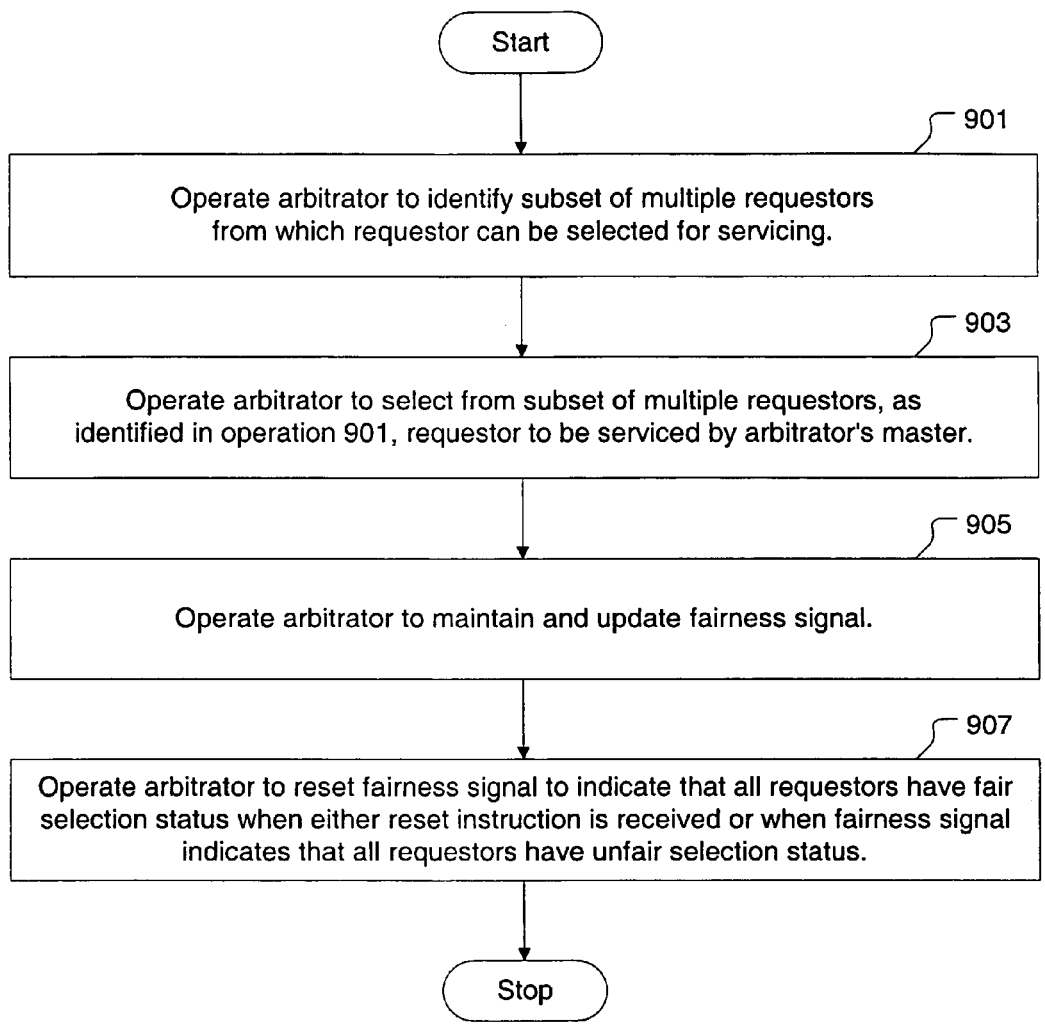
FIG. 9 is an illustration showing a flowchart of the method for operating each arbitrator in a hierarchy of arbitrators to uniquely connect multiple requestors to multiple masters in a common clock cycle.

The present invention can also be embodied as a method for operating each arbitrator in a hierarchy of arbitrators to uniquely connect multiple requestors to multiple masters in a common clock cycle. FIG. 9 is an illustration showing a flowchart of the method for operating each arbitrator in a hierarchy of arbitrators to uniquely connect multiple requestors to multiple masters in a common clock cycle. The method includes an operation 901 for operating the arbitrator to identify a subset of the multiple requestors from which a requestor can be selected for servicing. The subset of the multiple requestors includes requestors that satisfy the following requirements:

the requestor is currently transmitting a request as indicated by the inc_req signal, the requestors is visible to the arbitrator and not visible to a higher level arbitrator in the arbitrator hierarchy as indicated by the rem_mask signal, and the requestor is not currently being serviced by either of the multiple masters as indicated by the reg_sel signal.

The method also includes an operation 903 for operating the arbitrator to select from the subset of the multiple requestors, as identified in the operation 901, a requestor to be serviced by the arbitrator's master. It should be appreciated that each arbitrator in the arbitrator hierarchy is defined to identify the subset of the multiple requestors and select a requestor from the subset of the multiple requestors for servicing in a same clock cycle.

In one embodiment, the method can also include an operation 905 for operating the arbitrator to maintain and update a fairness signal, i.e., the fairness_mask as previously discussed. Each requestor that has not yet been selected for servicing has a fair selection status within the fairness signal. Also, each requestor that has been selected for servicing has an unfair selection status within the fairness signal. For a given requestor to be included within the identified subset of the multiple requestors, the given requestor is required to have a fair selection status within the fairness signal. The method further includes an operation 907 for operating the arbitrator to reset the fairness signal to indicate that all requestors have a fair selection status when either a reset instruction is received by the arbitrator (the reset bit 317 has a high state) or when the fairness signal indicates that all requestors have an unfair selection status (each bit in the fairness_mask has a low state).

One skilled in the art will appreciate that the present invention can be defined on a semiconductor chip using logic gates configured to provide the functionality of the method as previously discussed. For example, a hardware description language (HDL) can be employed to synthesize hardware and a layout of the logic gates for providing the necessary functionality described herein.

Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A circuit for handling multiple requestors desiring access to a resource, comprising:
    a plurality of masters; and
    a plurality of arbitrators, wherein each arbitrator is assigned to a different one of the plurality of masters, wherein each arbitrator is defined to consider a different portion of the multiple requestors when selecting a requestor to be serviced by the master to which the arbitrator is assigned, and wherein each arbitrator is further defined to select a requestor from the different portion of the multiple requestors in a same clock cycle such that selection of a particular requestor is not duplicated among the plurality of arbitrators.

2. A circuit for handling multiple requestors desiring access to a resource as recited in claim 1, wherein each of the plurality of arbitrators is defined to generate a first signal that identifies which of the multiple requestors defines the different portion of the multiple requestors to be considered for selection.

3. A circuit for handling multiple requestors desiring access to a resource as recited in claim 2, wherein the plurality of arbitrators forms an arbitrator hierarchy, each arbitrator being defined to communicate the first signal to each lower level arbitrator in the arbitrator hierarchy to enable each lower level arbitrator to identify the different portion of the multiple requestors to be considered for selection.

4. A circuit for handling multiple requestors desiring access to a resource as recited in claim 2, wherein each of the plurality of arbitrators is defined to generate a second signal that identifies a final set of requestors to be considered for selection,
    wherein each requestor in the final set of requestors is currently transmitting a request,
    wherein each requestor in the final set of requestors is included in the different portion of the multiple requestors to be considered for selection as identified by the first signal, and
    wherein each requestor in the final set of requestors is not currently being serviced by any of the plurality of masters.

5. A circuit for handling multiple requestors desiring access to a resource as recited in claim 4, wherein each of the plurality of arbitrators is defined to select a most significant requestor from within the final set of requestors to be serviced by the master to which the arbitrator is assigned.

6. A circuit for handling multiple requestors desiring access to a resource as recited in claim 4, wherein each requestor in the final set of requestors is identified by a fairness signal as having a fair selection status, each arbitrator being defined to maintain and update the fairness signal, the fairness signal indicating that each requestor not yet selected for servicing has a fair selection status, and each requestor that has been selected for servicing does not have a fair selection status.

7. A circuit for handling multiple requestors desiring access to a resource as recited in claim 6, wherein each arbitrator is defined to reset the fairness signal to indicate that all requestors have a fair selection status when either a reset instruction is received by the arbitrator or when the fairness signal indicates that all requestors do not have a fair selection status.

8. A circuit for handling multiple requestors desiring access to a resource as recited in claim 1, wherein each arbitrator is defined to register the requestor selected from the different portion of the multiple requestors for servicing, each arbitrator being further defined to direct the master assigned to the arbitrator to service the registered requestor in subsequent clock cycles following the clock cycle in which the requestors are selected by each arbitrator.

9. A circuit for handling multiple requestors desiring access to a resource as recited in claim 8, wherein each arbitrator is defined to communicate the registered requestor to each other arbitrator during servicing of the registered requestor by the master assigned to the arbitrator, each arbitrator that receives the communication of the registered requestor being defined to avoid duplicating selection of the registered requestor.

10. An interface circuit defined to connect a plurality of requestors to a plurality of masters, comprising:
    a plurality of arbitrators respectively assigned to the plurality of masters, each of the plurality of arbitrators defined to select in a same clock cycle a different one of the plurality of requestors to be serviced by the master to which the arbitrator is assigned, each of the plurality of arbitrators including mask generation logic, input processing logic, remaining requestors determination logic, and requestor selection logic.

11. An interface circuit defined to connect a plurality of requestors to a plurality of masters as recited in claim 10, wherein the mask generation logic is defined to generate a bit-mask that identifies a subset of the plurality of requestors that the arbitrator is allowed to consider for selection.

12. An interface circuit defined to connect a plurality of requestors to a plurality of masters as recited in claim 11, wherein the arbitrator is defined to communicate the bit-mask generated by the mask generation logic to each lower level arbitrator in a hierarchy of the plurality of arbitrators.

13. An interface circuit defined to connect a plurality of requestors to a plurality of masters as recited in claim 12, wherein the input processing logic of a given arbitrator is defined to receive the bit-masks generated by the higher level arbitrators and compare the received bit-masks to the bit-mask generated by mask generation logic of the given arbitrator to establish a set of requestors that can be considered for selection by the given arbitrator and are not considered for selection by higher level arbitrators.

14. An interface circuit defined to connect a plurality of requestors to a plurality of masters as recited in claim 13, wherein the remaining requestors determination logic is defined to identify a final set of requestors to be considered for selection,
    wherein each requestor in the final set of requestors is currently transmitting a request,
    wherein each requestor in the final set of requestors is included in the set of requestors that can be considered for selection by the given arbitrator and are not considered for selection by higher level arbitrators, and
    wherein each requestor in the final set of requestors is not currently being serviced by either of the plurality of masters.

15. An interface circuit defined to connect a plurality of requestors to a plurality of masters as recited in claim 14, wherein each of the plurality of arbitrators is defined to select a most significant requestor from within the final set of requestors to be serviced by the master to which the arbitrator is assigned.

16. An interface circuit defined to connect a plurality of requestors to a plurality of masters as recited in claim 14, wherein each requestor in the final set of requestors is identified by a fairness signal as having a fair selection status, each arbitrator being defined to maintain and update the fairness signal, the fairness signal indicating that each requestor not yet selected for servicing has a fair selection status, and each requestor that has been selected for servicing does not have a fair selection status.

17. An interface circuit defined to connect a plurality of requestors to a plurality of masters as recited in claim 16, wherein each arbitrator is defined to reset the fairness signal to indicate that all requestors have a fair selection status when either a reset instruction is received by the arbitrator or when the fairness signal indicates that all requestors do not have a fair selection status.

18. A method for operating each arbitrator in a hierarchy of arbitrators to uniquely connect multiple requestors to multiple masters in a common clock cycle, wherein each arbitrator supports a different one of the multiple masters, comprising:
    operating the arbitrator to identify a subset of the multiple requestors from which a requestor can be selected for servicing, the subset of the multiple requestors including requestors that are currently transmitting a request, and requestors that are visible to the arbitrator and not visible to a higher level arbitrator in the arbitrator hierarchy, and requestors that are not currently being serviced by any of the multiple masters; and
    operating the arbitrator to select from the identified subset of the multiple requestors a requestor to be serviced by the master being supported by the arbitrator,
    wherein each arbitrator in the arbitrator hierarchy is defined to identify the subset of the multiple requestors and select a requestor from the subset of the multiple requestors for servicing in a same clock cycle.

19. A method as recited in claim 18, further comprising:
    operating the arbitrator to maintain and update a fairness signal, each of the multiple requestors having a fairness status indicated by the fairness signal, each requestor that has not yet been selected for servicing having a fair selection status within the fairness signal, and each requestor that has been selected for servicing having an unfair selection status within the fairness signal, wherein each requestor within the identified subset of the multiple requestors are required to have a fair selection status within the fairness signal.

20. A method as recited in claim 19, further comprising:
    operating the arbitrator to reset the fairness signal to indicate that all requestors have a fair selection status when either a reset instruction is received by the arbitrator or when the fairness signal indicates that all requestors have an unfair selection status.

\* \* \* \* \*